United States Patent [19]

Harwood et al.

[11] Patent Number: 5,597,875
[45] Date of Patent: Jan. 28, 1997

[54] PROCESS TO IMPROVE CHEMICAL AND OXIDATIVE STABILITY OF HYDROGENATED POLYMERS

[75] Inventors: H. James Harwood, Stow; Steven W. Jolly, Wooster, both of Ohio

[73] Assignee: University of Akron, Akron, Ohio

[21] Appl. No.: 495,210

[22] Filed: Jun. 27, 1995

[51] Int. Cl.⁶ .................................................. C08F 8/34
[52] U.S. Cl. ........................... 525/332.8; 525/332.9; 525/333.1; 525/333.2; 525/343; 525/379; 525/385
[58] Field of Search ........................... 525/332.8, 332.9, 525/333.1, 333.2, 343, 379, 385

[56] References Cited

U.S. PATENT DOCUMENTS

| | | |
|---|---|---|
| 5,110,876 | 5/1992 | Harwood et al. . |
| 5,166,277 | 11/1992 | Goodwin et al. . |
| 5,272,215 | 12/1994 | Harwood et al. . |
| 5,292,826 | 3/1994 | Manabe et al. . |
| 5,416,168 | 5/1995 | Willis et al. .............................. 525/385 |
| 5,418,296 | 5/1995 | Willis et al. ......................... 525/332.8 |
| 5,521,255 | 5/1996 | Roy ...................................... 525/332.9 |

*Primary Examiner*—Bernard Lipman
*Attorney, Agent, or Firm*—Renner, Kenner, Greive, Bobak, Taylor & Weber

[57] ABSTRACT

This invention describes chemical modifications of hydrogenated polymers, particularly thermoplastic elastomers, e.g., Kraton® G, to increase the chemical resistance thereof. The number of residual reactive unsaturated diene-based mid-blocks were reduced through a post-hydrogenation reaction with an alkyl phenyl ether, e.g., anisole. The anisolated thermoplastic elastomer was then further reacted with benzenesulfonylation and nitration reactions to produce even more useful derivatives thereof.

30 Claims, 8 Drawing Sheets

PROCESS TO IMPROVE CHEMICAL AND OXIDATIVE STABILITY OF HYDROGENATED POLYMERS

TECHNICAL FIELD

This invention describes a process, by which the residual unsaturation remaining after hydrogenation of unsaturated units in a polymer and/or copolymer and/or thermoplastic elastomer, is further reduced through a post-hydrogenation reaction using alkyl aromatic ethers, particularly alkyl phenyl ethers, cyclic ethers, thioethers, acyl amines, and substituted derivatives thereof, all of which are susceptible to electrophilic alkylation, thereby improving the ozone resistance, as well as the oxidative and chemical stability of the final polymer product.

BACKGROUND OF THE INVENTION

Thermoplastic elastomers are a special class of polymers of practical and theoretical interest. They were introduced by the Shell Chemical Company (U.S.A.) in 1965. Thermoplastic elastomers are novel because they can be formed into useful articles by common, rapid, thermoplastic processing techniques. They exhibit rubber-like properties such as high resilience, high tensile strength and reversible elongation. Thermoplastic elastomers consist of block copolymers of the A—B—A structure, —(A—B)$_n$— structure or even —[B$_x$—C(A)—]$_n$—, where A is a polymeric segment having a high glass transition temperature and B is an elastomeric polymer segment, n is the number of repeating block sequences in the polymer, x is the number of repeating units of one monomer in the polymer and C represents a graft point in the polymer backbone. There are four factors which influence the elastomeric performance of these polymers. They are choice of monomers, block lengths of A and B, weight fractions of A and B, and the molecular weight distribution of the elastomeric B block.

Typically, thermoplastic elastomers are formed by sequentially incorporating aromatic monomers, such as styrene, and dienes, such as butadiene or isoprene, into polymer chains using anionic polymerization chemistry. This results in A—B—A triblock copolymers which have polybutadiene and/or polyisoprene and/or other unsaturated blocks present in the center (B) portion. It is also known to substitute other polymers for the polystyrenic end blocks thereby synthesizing polymers with end-blocks consisting of poly(α-methylstyrene), poly(4-vinylbiphenyl), poly(styrene-co-1,1-diphenylethylene), poly(styrene-co-α-methylstyrene) and poly(vinyl naphthalenes).

The unsaturation present in the center blocks is undesirable for applications in which good chemical resistance is required. For example, the unsaturation causes the polymers to have limited thermal stability and poor resistance to atmospheric oxygen and ozone. The polymers are also susceptible to halogens and strongly acidic materials, due to the high reactivity of the unsaturated units in their center blocks toward such reagents. Limited chemical stability is a well-recognized deficiency of all polymers with unsaturated repeating units, especially those derived from diene monomers.

Polymers containing unsaturated monomer units are often hydrogenated to obtain materials that have improved thermal and chemical stability. For example, the polymer that results from butyl lithium initiated polymerization of butadiene contains 1,4-butadiene and 1,2-butadiene repeating units and it reacts easily with oxygen, ozone and other chemicals. When this polymer is hydrogenated, it becomes a copolymer of ethylene and butene-1. This polymer has much better chemical resistance than the parent polybutadiene. Similarly, hydrogenation of polyisoprene yields a copolymer containing ethylene and propylene repeating units. This polymer also has much better chemical resistance than the parent polymer. Hydrogenation of unsaturated units in copolymers is also an important way to improve chemical and thermal stability. Hydrogenation of a statistical styrene-butadiene copolymer, for example, yields a polymer containing styrene, ethylene and butene-1 units. Of special interest today is the product obtained by hydrogenating the butadiene repeating units in butadiene-acrylonitrile copolymers. The resulting polymers have excellent chemical and solvent resistance and are useful in seals and gaskets.

Hydrogenation of the unsaturated blocks in thermoplastic elastomers, such as the Kraton series of polymers has resulted in commercial products (e.g., Kraton® G-1652) that have improved chemical resistance compared to their unhydrogenated counterparts, making them and their analogs important commercial products for this very reason. The chemical stability of the hydrogenated products is sufficiently high to permit chemical modification of the blocks containing the aromatic monomers (e.g., polystyrene) to obtain thermoplastic elastomers with increased softening points and other useful characteristics. Such chemical modifications are not possible with the parent unsaturated polymers.

Hydrogenation of unsaturated units in polymers is catalyzed by metals or metal salts and is an equilibrium process. Although the equilibrium between saturated and unsaturated units heavily favors the formation of hydrogenated units, the reaction cannot be conducted completely. When the reaction is conducted under conditions that are commercially practical, the hydrogenated polymers can contain as much as one (1) percent residual unsaturation. This presence of such residual unsaturation adversely affects properties such as oxidative resistance and ozone resistance. It also creates difficulties when attempts are made to modify thermoplastic elastomers by nitration or arylsulfonylation.

For example, when attempts are made to nitrate or arylsulfonate the styrene units in Kraton® G-1652, the molecular weights of the polymers rapidly increase, reaching values in the millions, and the reaction mixtures become gels that cannot be stirred. Products isolated from the reactions cannot be processed by conventional thermoplastic means and are believed to be crosslinked. This behavior is attributed to the ability of unsaturated butadiene units in the polybutadiene segments of the polymer to alkylate polystyrene units in the polymers, and thereby cause branching or crosslinking reactions. This problem is particularly acute when nitration and arylsulfonylation reactions are attempted because branching occurs much faster than the desired nitration or arylsulfonylation reactions. The problem is not as severe when the substitution reaction occurs much faster than the branching reaction, as is the case when acylation reactions are used to modify hydrogenated thermoplastic elastomers.

Residual unsaturation which remains after hydrogenation of an unsaturated elastomers is undesirable and is a point of chemical instability. In the invention described herein, post-hydrogenation reactions are used to remove or significantly lower the amount of residual unsaturation in hydrogenated polymers and copolymers and thereby enhance the chemical resistance of the polymers. For example, as the following discussion will show, modification of Kraton® G-1652 by reaction with anisole, removes a large portion of the residual unsaturated butadiene units and thus enables the resulting polymer to be nitrated or arylsulfonylated without the difficulties that attend attempts to nitrate or arylsulfonate unmodified Kraton® G-1652. Since improved resistance to acid promoted branching and/or crosslinking has been demonstrated to result from post-hydrogenation treatment, it is inferred that improved resistance to chemical processes, including oxidation and ozonolysis also results from post-hydrogenation reaction.

SUMMARY OF THE INVENTION

In accordance with the present invention, there is provided a method of increasing the chemical resistance of hydrogenated polymers in general. This involves inducing residual unsaturated units present in the polymer to alkylate an agent that is particularly susceptible to alkylation, particularly an alkyl aryl ether, e.g., anisole, in the presence of an acid or Lewis acid catalyst. Substances that are also effectively alkylated in this system would include alkyl aryl thioethers, alkyl substituted aromatic compounds and N-acyl derivates of arylamines. The agent must be a compound that is very susceptible to electrophilic substitution and must be more easily substituted than any aromatic substituents present on the hydrogenated polymer. It will preferably be a liquid that can be easily separated from the modified polymer by distillation or precipitation.

In conducting the post-hydrogenation reaction, the polymer is allowed to react with a molar excess of the alkylatible modifying substance (compared to the moles of residual unsaturated units present) in the presence of a strong acid or Lewis acid catalyst. Typical catalysts would include sulfuric acid, aluminum chlorides, zinc chlorides, boron halides and tin halides. The reaction may be conducted in a typical stilted reactor and the reactants dissolved in an appropriate inert solvent (hydrocarbon, halocarbon, carbon disulfide, nitroethane, nitrobenzene) or may be conducted in an extrusion device. The amount of modifying substance may be as low as one mole per mole of residual unsaturated units present, but more typically, the amount may be as much as 100 times the stoichiometric amount or more.

Hydrogenated polymers that are exemplary of those that can be modified by this invention would include hydrogenated polymers derived from butadiene and substituted butadienes such as isoprene, 2-methyl-1,3-pentadiene, 2-phenylbutadiene, chloroprene, hydrogenated polymers derived from cyclic polyolefins such as cyclooctadiene and substituted cyclooctadienes (e.g. methyl cyclooctadiene and phenylcyclooctadiene), hydrogenated products formed by acyclic diene metathesis (ADMET) polymerization, hydrogenated copolymers and terpolymers of vinyl monomers, including acrylates and methacrylates with dienes and cyclic polyenes, etc. The copolymers may have statistical, alternating, block, graft or star (radial block) architectures. In fact, the invention is not limited to the architecture of the polymer.

Conditions and times for the reactions will depend on the particular hydrogenated polymer, modifying agent, solvent and catalyst. In general, they will be selected such that reaction of the residual unsaturated units in the hydrogenated polymer will occur in a reasonable time without enabling the unsaturated units to alkylate aromatic substituents present on the polymer or without enabling the polymer to partake in any other reactions to an undesirable extent.

These and other objects of this invention will be evident when viewed in light of the drawings, detailed description, and appended claims.

BRIEF DESCRIPTION OF THE DRAWINGS

The invention may take physical form in certain parts and arrangements of pans, a preferred embodiment of which will be described in detail in the specification and illustrated in the accompanying drawings which form a part hereof, and wherein.

DETAILED DESCRIPTION OF THE INVENTION

Figure 1:
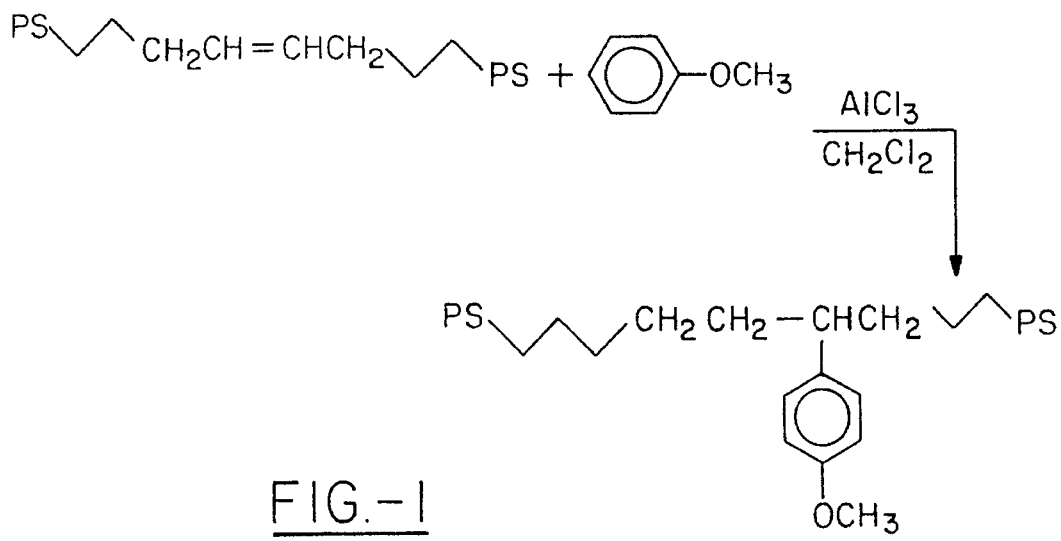
FIG. 1 shows the reaction of anisole with unhydrogenated 1,4-butadiene units.

Referring now to the drawings wherein the showings are for purposes of illustrating the preferred embodiment of the invention only and not for purposes of limiting the same, the Figures show physical measurement characteristics for parent elastomer, chlorinated elastomer, anisolated elastomer, and anisolated elastomer further modified by either nitration or benzensulfonylation.

The best mode for carrying out the invention will now be described for the purposes of illustrating the best mode known to the applicant at the time. The examples are illustrative only and not meant to limit the invention, as measured by the scope and spirit of the claims.

Experimental Procedures

Example #1

Mid-Segment Modification through Anisolation

Figure 2:
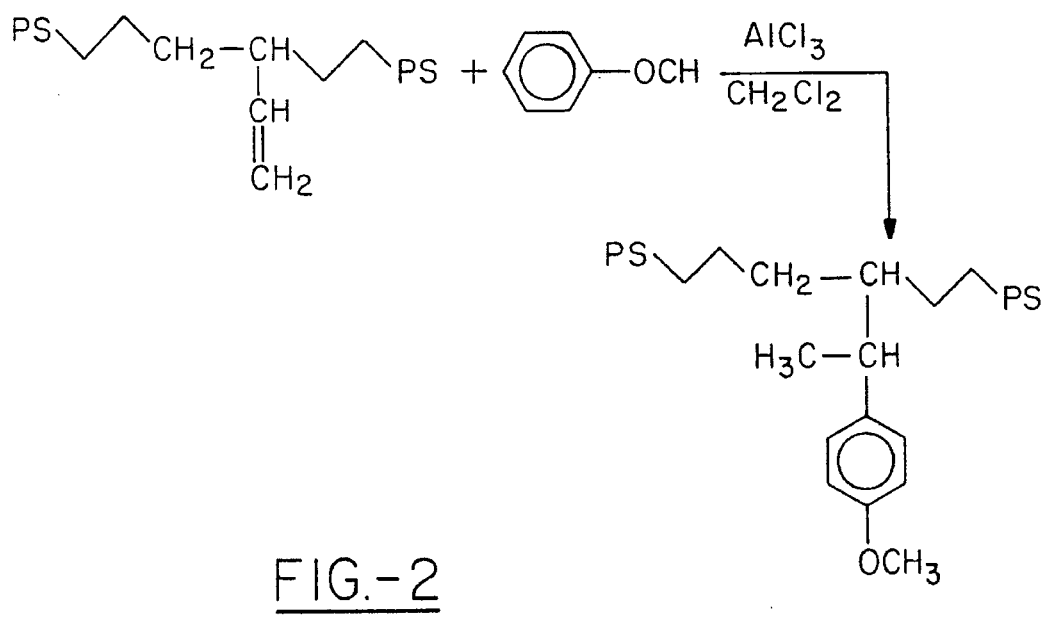
FIG. 2 shows the reaction of anisole with unhydrogenated 1,2-butadiene units.

The mid-block segment of the parent copolymer Kraton® G-1652 was dissolved in a solvent and reacted with anisole. The desired result was to add anisole across any double bonds present as shown in FIGS. 1 and 2, showing the reaction of anisole with unhydrogenated 1,4-butadiene units and unhydrogenated 1,2-butadiene units respectively.

Figure 3:
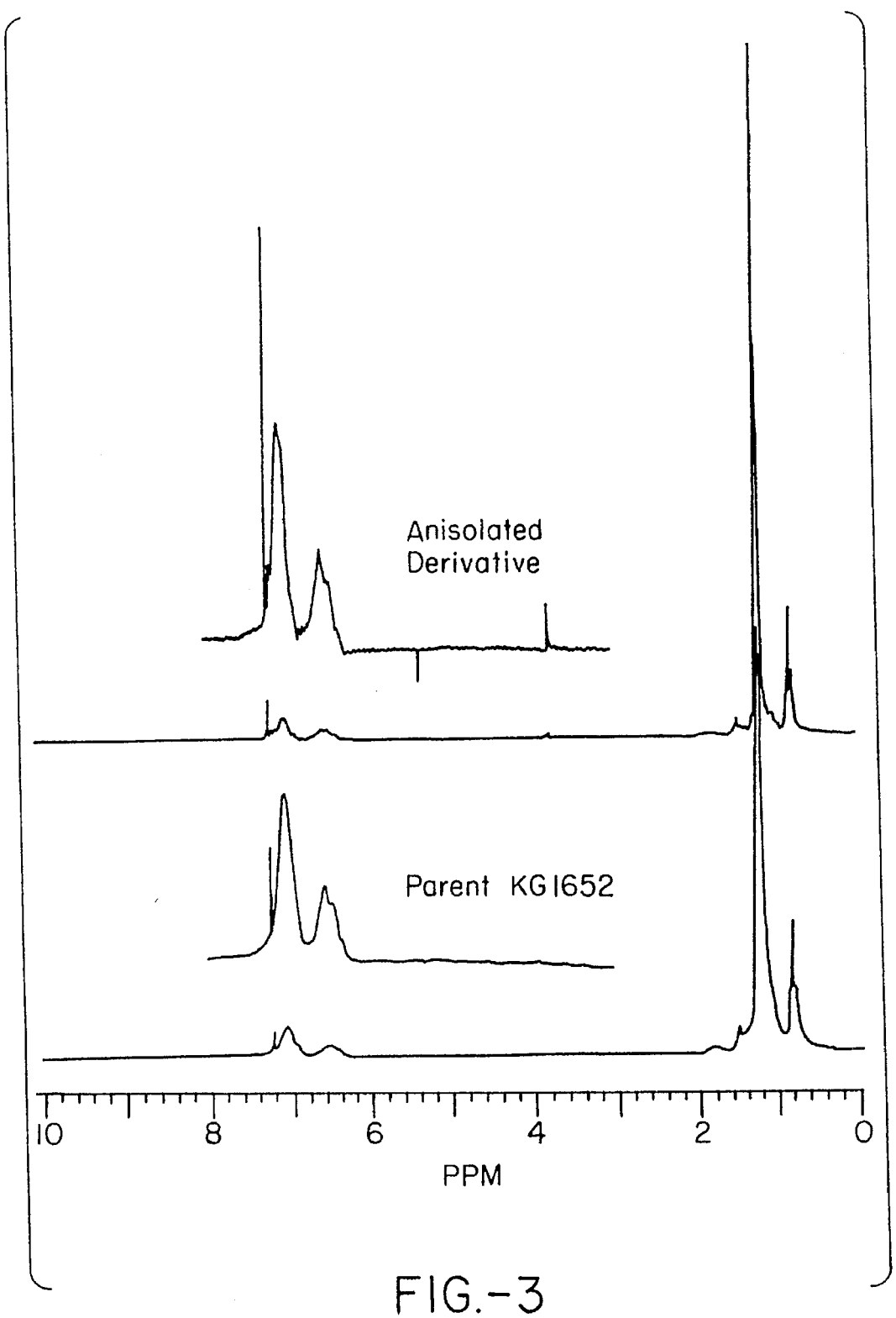
FIG. 3 shows the 200 MHz $^1$H-NMR Spectra of Kraton® G-1652 and an anisolated derivative.
Figure 4:
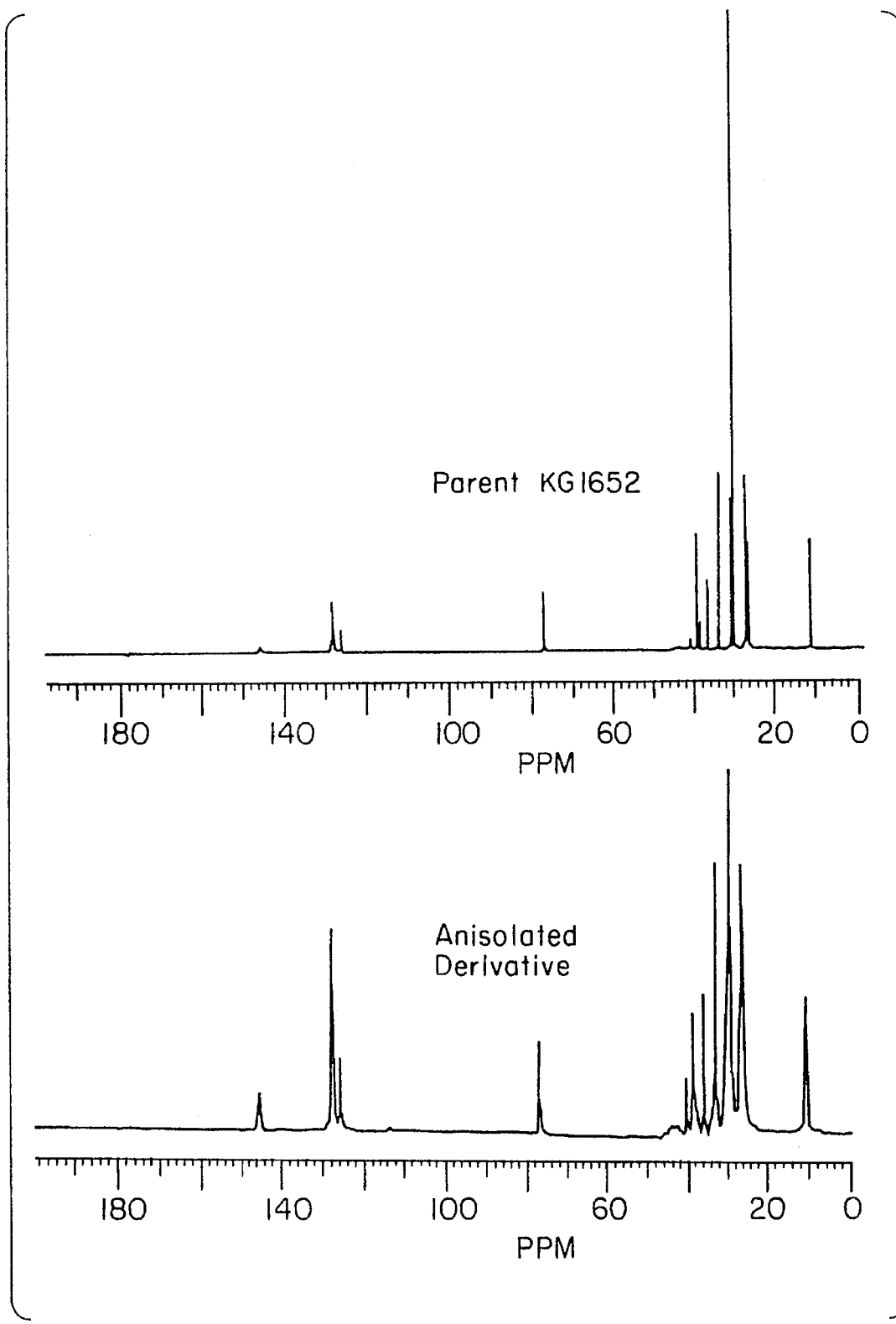
FIG. 4 shows a 100 MHz $^{13}$C-NMR Spectra of Kraton® G-1652 and an anisolated derivative shown at about 4 ppm.
Figure 5:
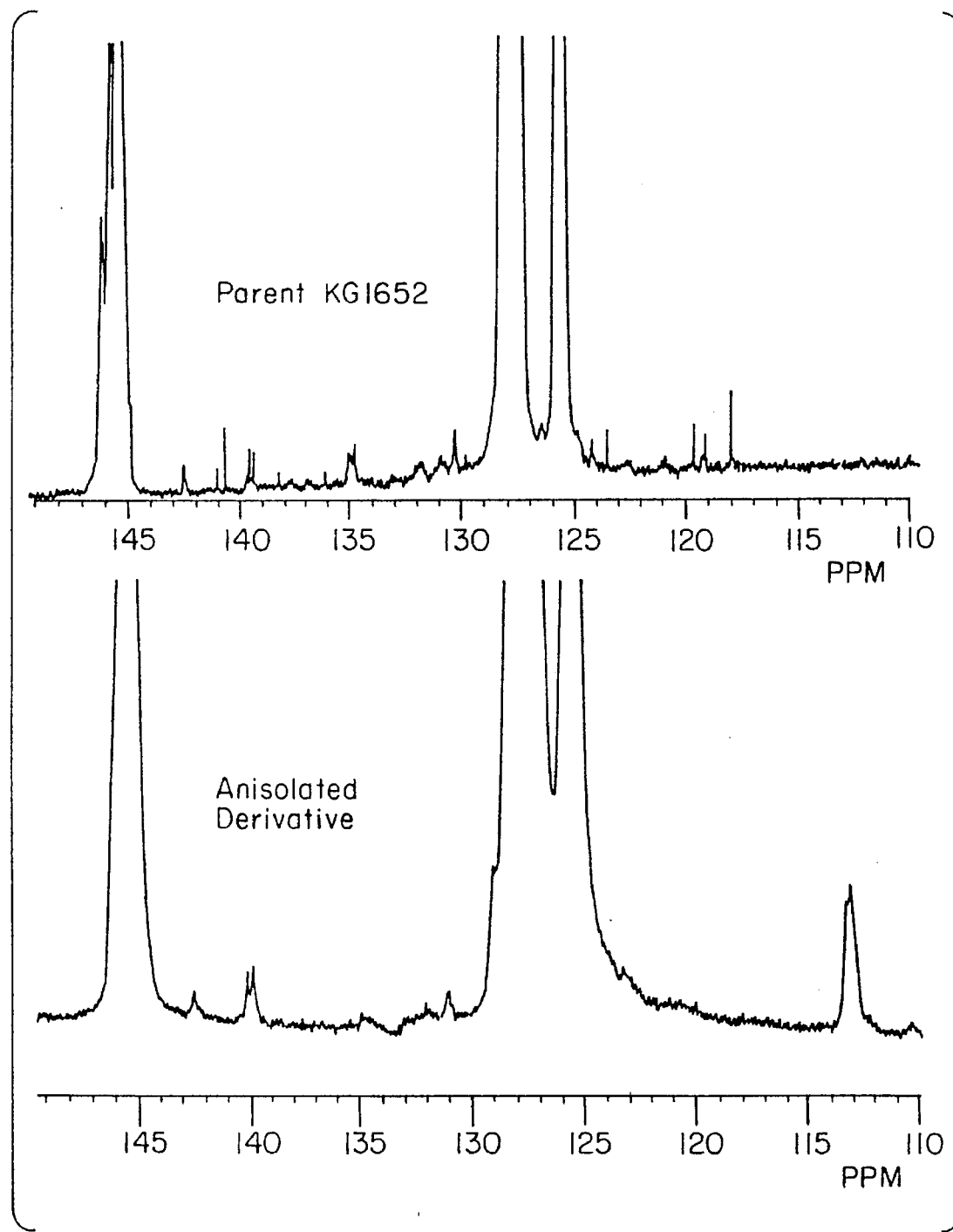
FIG. 5 shows a 100 MHz $^{13}$C-NMR Spectra of Kraton® G-1652 and an anisolated derivative in the aromatic resonances region.
Figure 6:
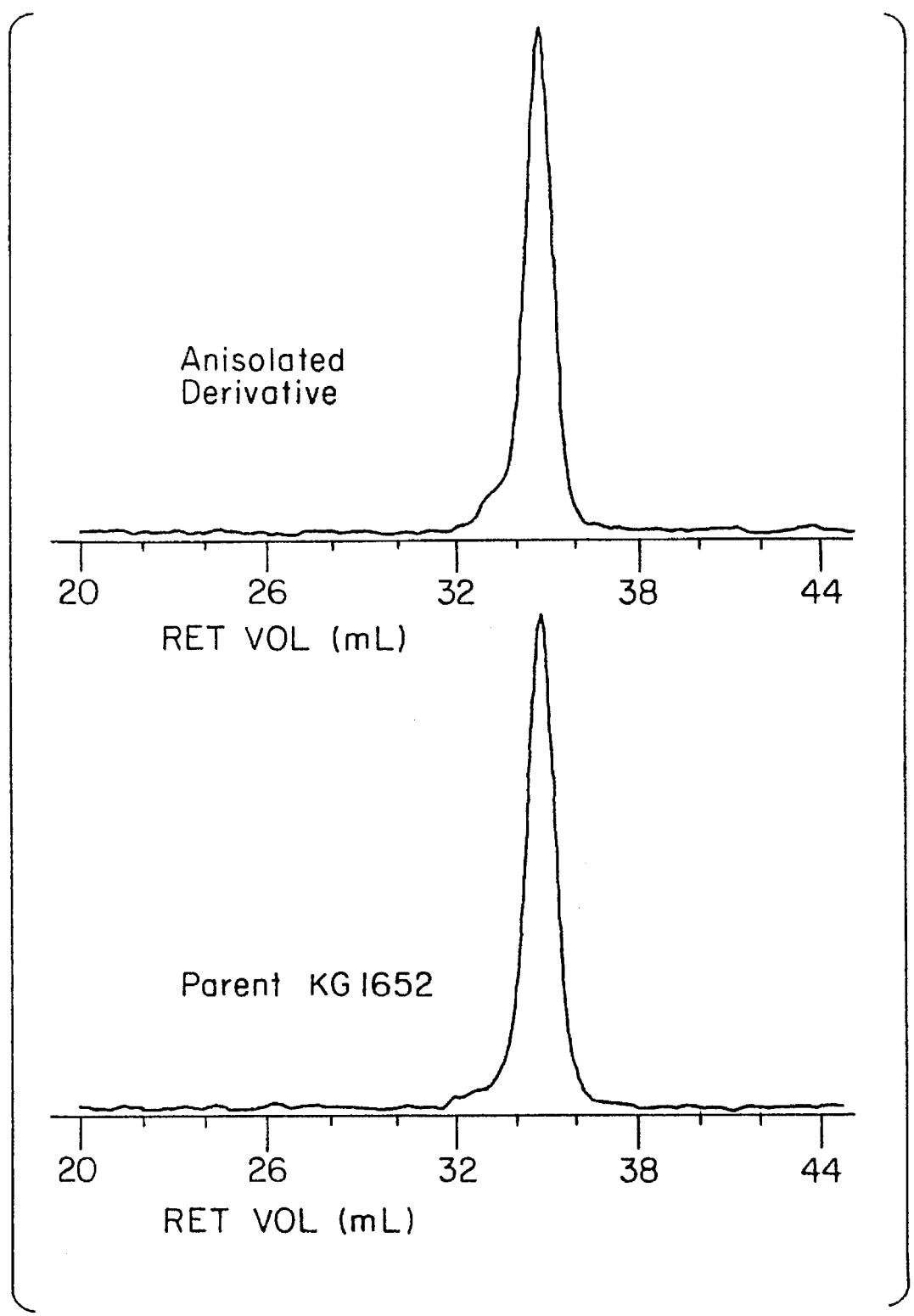
FIG. 6 shows Size Exclusion Chromatographs of Kraton® G-1652 and an anisolated derivative.

A solution of Kraton® G-1652 (2.0 g, 5.78 mmol) in $CH_2Cl_2$ (0.030 L) and anisole (0.005 L, 46.2 mmol) was treated with $AlCl_3$ (0.39 g, 2.89 mmol) and the mixture was stirred for 14 hours at 20° C. under $N_2$. The solution remained clear. In contrast, a similar reaction conducted in the absence of anisole resulted in gelation. The anisolated derivative was isolated by pouring the reaction flask contents into rapidly stirred MeOH (0.1 L) and collected and dried in the usual work-up. The $^1$H-NMR and $^{13}$C-NMR spectra of the product are compared with the spectra of the starting copolymer in FIGS. 3, 4 and 5. The $^1$H-NMR spectrum of the product contained a resonance at approximately 3.8 ppm that is attributed to the methoxy protons of anisole residues. Based on the relative area of this signal and the relative area of the aromatic proton resonance of the styrene units in the copolymer, it is estimated that 0.3 mol percent of butadiene units (approximately 2 units/chain) originally present in Kraton® G-1652 were substituted by anisole units. The $^{13}$C-NMR spectrum of the anisolated product (sample B305B2) was almost devoid of resonances in the 118–122 and 137–139 ppm region that are present in the spectrum of the parent copolymer and are attributed to unhydrogenated 1,4-butadiene units. The $^{13}$C-NMR spectrum of the anisolated product (B305B2) contained resonances at 113 and 140 ppm that can be attributed to the aromatic carbons of anisole units attached to the polymer. There is thus substantial spectroscopic evidence indicating that unhydrogenated 1,4-butadiene units in the parent copolymer reacted with anisole although it should be noted that the resonances of the anisole unit occur in the same region as the resonances of unhydrogenated 1,2-butadiene units (134–135 ppm). The Size Exclusion Chromatographic (SEC) studies on the parent and anisolated copolymers indicated that there was hardly any difference in their molecular weights or molecular distributions, as can be appreciated by viewing the SEC curves shown in FIG. 6. The SEC results indicated $M_n$ values of the parent copolymer, Kraton® G-1652, and anisolated derivative, B305B2, were 34,100 and 39,400 respectively. The $M_w/M_n$ values remained the same at 1.03.

TABLE I

Characterization Data for Parent Kraton ® G-1652 & Anisolated Derivative

| Sample | Anisolation Time (hrs) | $M_n$ (g/mol) | $M_w/M_n$ | Remarks |
|---|---|---|---|---|
| Starting Materials | | | | |
| Kraton ® G-1652 | N/A | 34100 | 1.03 | base polymer for comparison |
| B305B2 | 14 | 39400 | 1.03 | anisolated Kraton ® G-1652 |

As shown in Table II, the anisolation reaction significantly affects the solubility characteristics of the final product, the anisolated product remaining soluble subsequent to reaction with aluminum chloride, whereas the non-anisolated parent Kraton® G-1652 producing a gel upon reaction with aluminum chloride.

TABLE II

Reaction Comparison for Parent Kraton ® G-1652 & Anisolated Derivative

| Starting Polymer | Anisolation Time (hrs) | $CH_2Cl_2$ | $AlCl_3$ | Remarks |
|---|---|---|---|---|
| Kraton ® G-1652 (5.78 mmol) | N/A | 30 mL | 2.89 mmol | gel |
| B305B2 (5.78 mmol) | 14 | 30 mL | 2.89 mmol | no gel |

Example #2

Mid-Segment Modification through Chlorination

The mid-block segment of the parent copolymer was chlorinated for comparative purposes to the anisolation procedure, by passing $Cl_2$ through a solution of Kraton® G-1652 in $CCl_4$. The desired result was to add chlorine across any double bonds present.

Two samples of chlorinated Kraton® G-1652 were prepared. Sample B220A1 was prepared by passing $Cl_2$ through a solution of Kraton® G-1652 in $CH_2Cl_2$ (50 g/L) for 0.75 hours at 25° C. The second sample B224A1, was prepared by passing $Cl_2$ through a solution of Kraton® G-1652 in $CCl_4$ (100 g/L) for 2.0 hours at 0° C. in the absence of light. In each case, the chlorinated derivative was isolated by precipitating the product into rapidly stirred MeOH, collecting the product by filtration through a Buchner funnel, dried by pulling air through the product, and subsequent drying in a 25° C. vacuum oven for 12 hours. The two chlorinated samples exhibited positive Beilstein flame tests, indicating the presence of chlorine. A control test performed on the parent copolymer was negative, thereby showing the absence of chlorine in the parent copolymer. Size Exclusion Chromatography (SEC) results indicated that the $M_n$ values of the parent copolymer, Kraton® G-1652, (B419B1) and the chlorinated samples (B220A1 and B224A1 ) were 43,500, 47,800 and 122,000 g/mol, respectively. Characterization data are summarized in Table III.

TABLE III

Characterization Data for Parent Kraton ® G-1652 & Chlorinated Derivative

| Sample | Chlorination Time (hrs) | $M_n$ (g/mol) | Remarks |
|---|---|---|---|
| Starting Materials | | | |
| B419B1 | N/A | 34100 | Kraton ® G-1652 |
| B220A1 | 0.75 | 47800 | chlorinated Kraton ® G-1652 |
| B224A1 | 2 | 122000 | chlorinated Kraton ® G-1652 |

EXAMPLE #3

Benzenesulfonylation of Chlorinated and Anisolated Kraton® G-1652

The chlorinated and anisolated derivatives of Kraton® G-1652 were then submitted to a benzenesulfonylation reaction, as has been employed previously for modifying the parent copolymer which had not been previously reacted with anisole. For the chlorinated derivatives this involved stirring a solution of the chlorinated copolymer in $CH_2Cl_2$ (100 g/L) for 1.0 hours at 20° C. with either a 4:1 molar excess of the benzenesulfonyl chloride:$AlCl_3$ complex to styrene residues (experiment B223A1, employing polymer B220A1) or an 8:1 molar excess of the benzenesulfonyl chloride:$AlCl_3$ complex to styrene residues (experiment B225A1, employing polymer B220A1, and experiment B226A1, employing polymer B224A1). Characterization data are summarized in Table IV.

TABLE IV

Characterization Data for Benzenesulfonylated Derivatives of Chlorinated and Anisolated Kraton ® G-1652

| Sample | % Benzene-sulfonylated | Rx. Time (hrs) | Ratio[1] AlCl$_3$ complex to PS residue | M$_n$ (g/mol) | Reactant Polymer used |
|---|---|---|---|---|---|
| Benzenesulfonated Derivatives Prepared from Nonchlorinated Polymer | | | | | |
| B221A1 | 12 | 1 | 5:1 | 358000 | B419B1 |
| B222A1 | 24 | 1 | 10:1 | 454000 | B419B1 |
| Benzenesulfonated Derivatives Prepared from Chlorinated Polymer Products | | | | | |
| B223A1 | 11 | 1 | 4:1 | 203000 | B220A1 |
| B225A1 | 30 | 1 | 8:1 | 830000 | B220A1 |
| B226A1 | 25 | 1 | 8:1 | 1000000 | B224A1 |
| Benzenesulfonated Derivatives Prepared from Anisolated Polymer Products | | | | | |
| | 34 | 1 | | ~50,000 | B305B2 |

[1] the AlCl$_3$ complex is the 1:1 combination of benezenesulfonyl chloride complexed to AlCl$_3$ The M$_n$ values of the benzenesulfonylated materials prepared from non-chlorinated and chlorinated polymers were many times those of the starting polymers indicating that a tendency for branching and/or crosslinking prevailed. In fact, this tendency was particularly severe when the most extensively chlorinated sample, B224A1, was used. This indicated that chlorinated butadiene units could alkylate styrene units of the polymer as easily or perhaps even more easily than did the unhydrogenated butadiene units. Accordingly further attempts to modify the chlorinated polymers were not undertaken.

When benzenesulfonylation of the anisolated product was attempted, a difference was immediately noticed between the anisolated and unmodified polymers. Reactions involving the anisolated copolymer appeared to occur about twice as fast as those with the parent copolymer. Additionally, the reaction mixtures involving the anisolated copolymer were less viscous than those of the parent copolymer. No gel particles formed in the mixture when the anisolated copolymer was used, and the products obtained from the anisolated starting material were readily soluble in THF whereas those obtained from unmodified Kraton® G-1652 were not.

Figure 7:
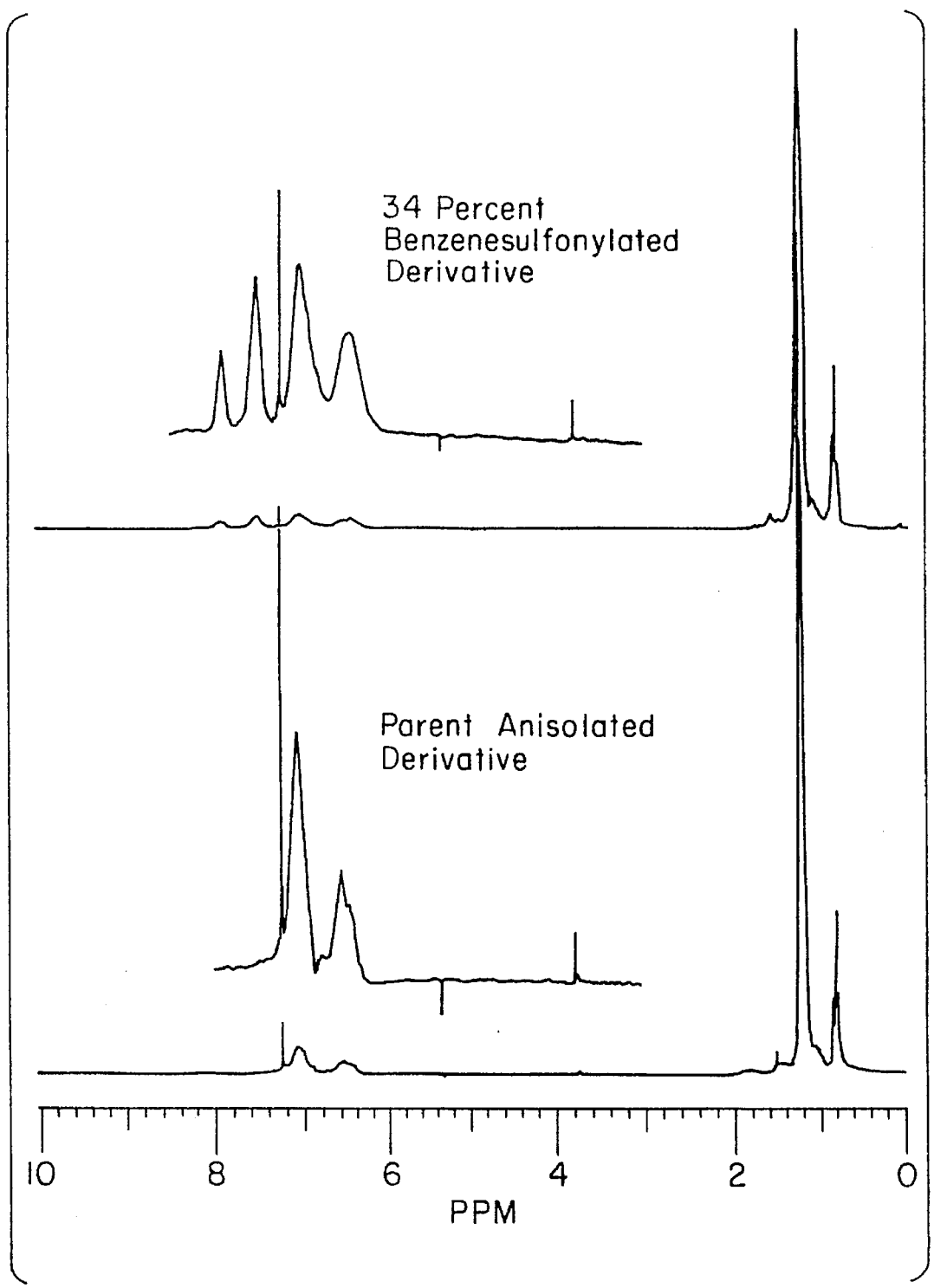
FIG. 7 shows the 200 MHz $^1$H-NMR Spectra of anisolated Kraton® G-1652 and a 34% benzenesulfonylated derivative derived from it.
Figure 8:
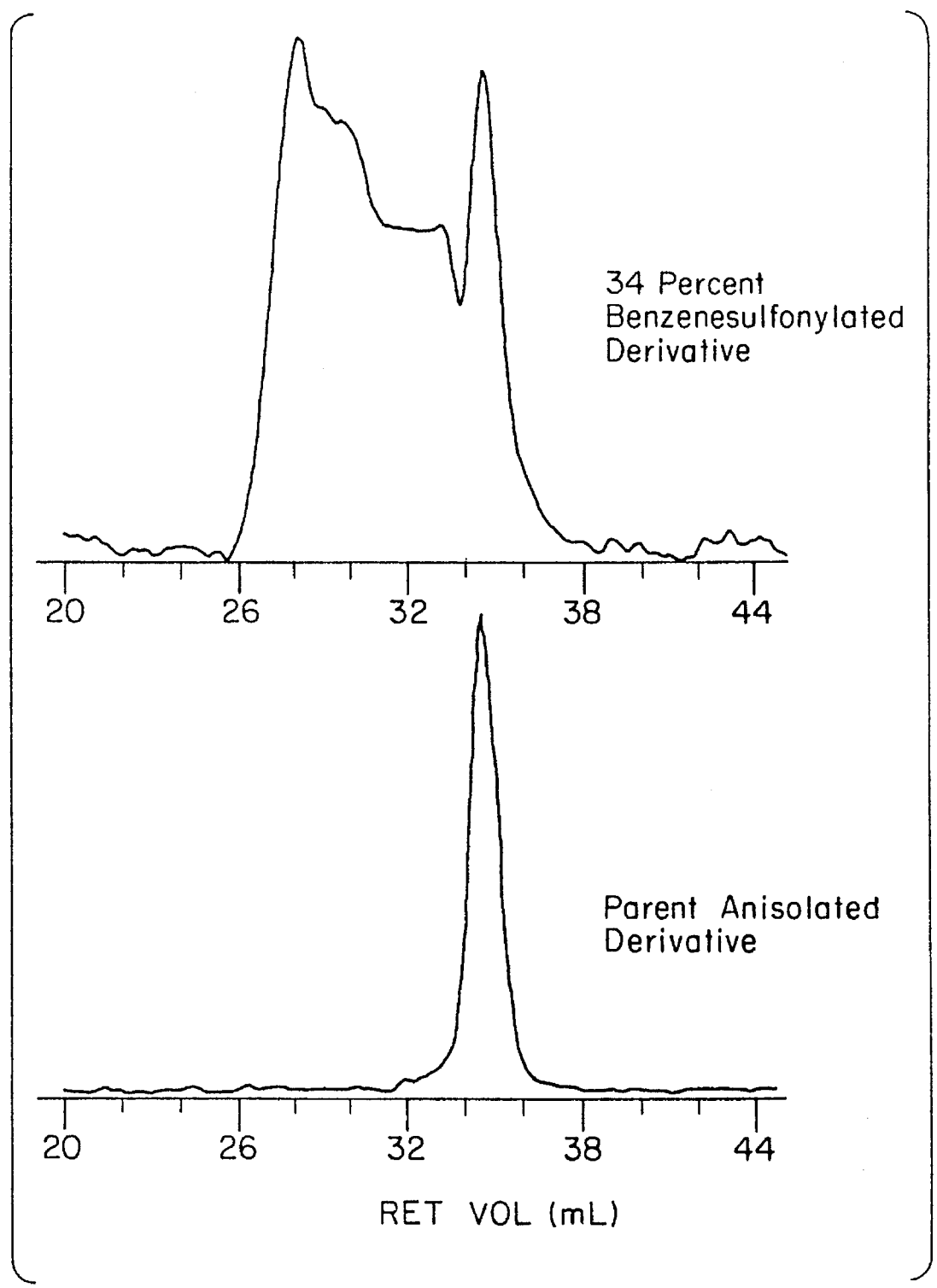
FIG. 8 shows Size Exclusion Chromatographs of anisolated Kraton® G-1652 and a 34% benzenesulfonylated derivative derived from it.

The $^1$H-NMR spectra of the anisolated parent copolymer and of its benzenesulfonylated derivative are shown in FIG. 7. Based on the aromatic proton resonance pattern, it is estimated that 34 percent of the styrene residues were benzenesulfonylated. The SEC results, FIG. 8, indicated that the benzenesulfonylated product had a broader molecular weight distribution than the parent anisolated copolymer. Although the M$_w$/M$_n$ of the product (10.5) is larger than that of the starting material (1.03), it is certainly not as high as the M$_w$/M$_n$ values that were observed previously (i e., about 55) for benzenesulfonylated products obtained from unmodified Kraton® G-1652. The number average molecular weight of the benzenesulfonylated product obtained from the anisolated starting material was substantially the same as that of the starting material. Although branching has not been eliminated completely by using an anisolated starting material, the use of such a material for the benzenesulfonylation reaction appears to be very desirable.

EXAMPLE #4

Nitronium Trifluoromethanesulfonate (Nitronium Triflate) Preparation

Trifluoromethanesulfonic acid (10.0 mL, 113 mmol) was dissolved in 30 mL of methylene chloride in a 500 mL 3-neck reaction flask equipped with a mechanical stirrer, N$_2$ inlet and a dropping funnel. Anhydrous nitric acid (2.30 mL, 53.3 mmol) was added drop-wise to this stirred solution. As the nitric acid was added a white, crystalline solid was continually formed. The white, crystalline solid was a mixture of nitronium trifluoromethanesulfonate (53.3 mmol) and hydronium trifluoromethanesulfonate (53.3 mmol).

Nitration using Nitronium Triflate

A solution of Kraton® G-1652 which had been previously anisolated (sample B305B2) (20.0 g, 55.8 mmol of styrene units) in 300 mL of methylene chloride was added slowly over 5 minutes to the stirred suspension of nitronium triflate (53.3 mmol) prepared above. The reaction was carried out at various temperatures (−28 to 25 ° C.) for reaction times which varied from 0.5–2 hours. The reaction was stopped by the slow addition of 25 mL of tetrahydrofuran over a 5 minute period. Twenty-five percent (25%) nitration of the styrene residues was obtained under conditions where 35% nitration was expected based upon the charge of nitronium triflate. Eight weight percent (8%) of the reaction product was an insoluble gel, which is less than one-half (½) the amount of gel that was obtained when unmodified Kraton® G-1652 was used as the starting material.

Figure 9:
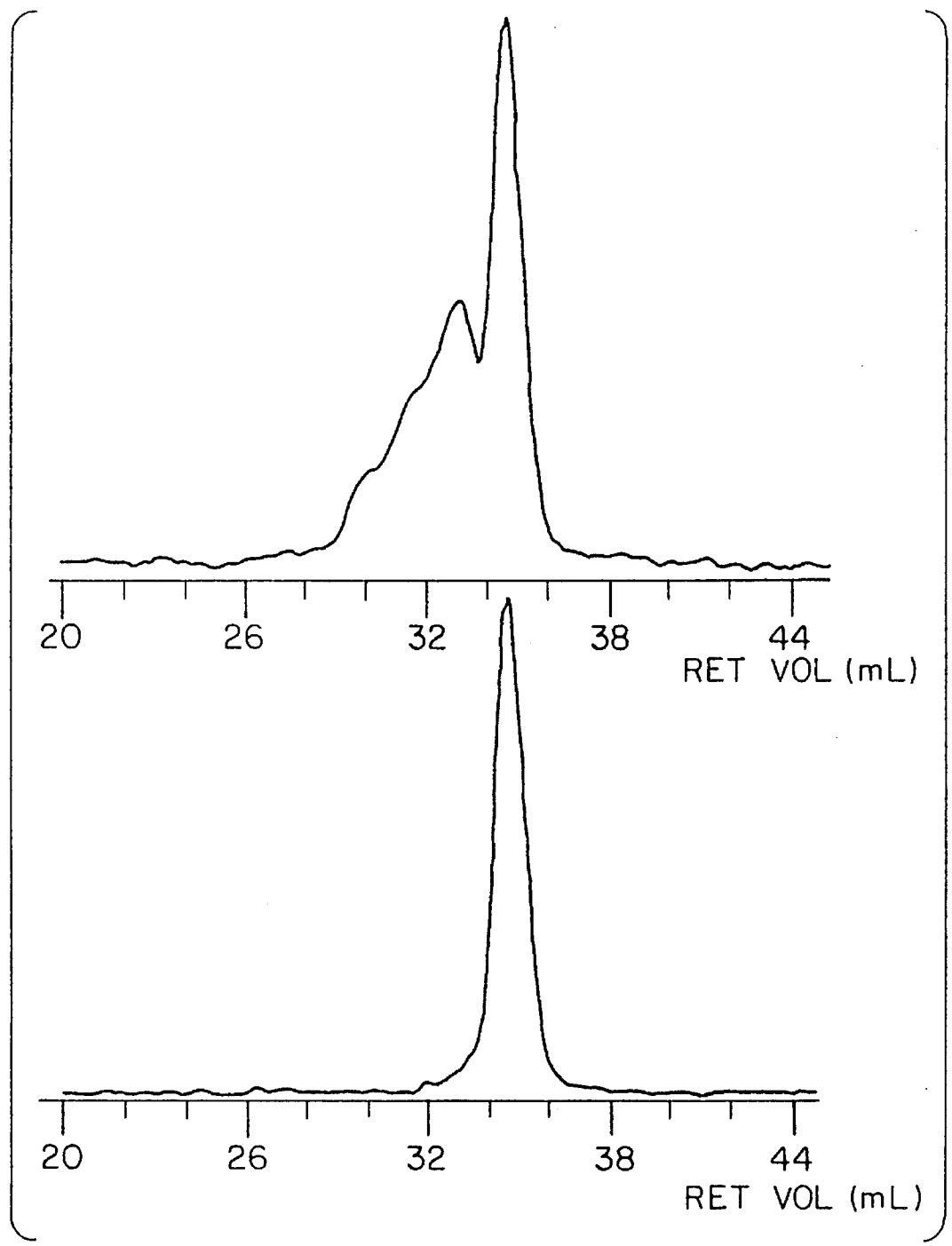
FIG. 9 shows a Size Exclusion Chromatographs of anisolated Kraton® G-1652 and a 25% nitrated derivative derived from it.

The SEC curves obtained for the parent anisolated copolymer (B305B2) and nitrated material (B419D 1 ) are shown in FIG. 9. The nitrated sample appears to consist of three components having peak retention volumes of 35, 33 and 30 mL. The low molecular weight component suggests that some chain scission has accompanied the nitration process and the high molecular weight component indicates that chain branching also occurs. Overall the nitration process resulted in a polymer with a M$_n$ of 34,500 g/mol which is close to that of the parent anisolated material (39,400 g/mol). The M$_w$/M$_n$ of this 35% nitrated derivative (2.01) is about two times as large as the M$_w$/M$_n$ of the parent anisolated copolymer (1.03). The M$_w$/M$_n$ of a 41% nitrated derivative (sample B401A1 ) obtained from unmodified Kraton® G-1652 was 2.35. Although branching and chain scission has apparently not been eliminated completely by using an anisolated starting material, the use of such a material for the nitration appears to be desirable.

While nitration using nitronium triflate is described above, alternative nitrating agents, such as acetyl nitrate and trihalo acetyl nitrate are also envisioned to be within the scope of this invention.

Discussion

The small amount of residual unsaturation present in hydrogenated polymers interferes with many use environments to which elastomers are exposed. Acidic reaction conditions which may be used to effect electrophilic substitution reactions on the polystyrene end-segments present in hydrogenated polystyrene-polybutadiene-polystyrene thermoplastic elastomers, promote both chain scission and branching reactions that involve unsaturated units present in the mid-segments of these thermoplastic elastomers. Anisolation and chlorination were attempted as means to remove unsaturated units from the starting polymer and thereby overcome this difficulty. Only anisolation was effective.

While the examples provided herein concern thermoplastic elastomers, there is no need to limit the scope of the invention to such. In fact, this technology is applicable to polymers that are obtained by hydrogenation of unsaturated polymers in general. Non-limiting additional examples would include hydrogenated polymers derived from butadiene and substituted butadienes such as isoprene, 2-methyl-1,3-pentadiene, 2-phenylbutadiene, chloroprene, hydrogenated polymers derived from cyclic polyolefins such as cyclooctadiene and substituted cyclooctadienes (e.g. methyl cyclooctadiene and phenylcyclooctadiene), hydrogenated products formed by acyclic diene metathesis (ADMET) polymerization, hydrogenated copolymers and terpolymers of vinyl monomers, including acrylates and methacrylates with dienes and cyclic polyenes, etc. The copolymers may have statistical, alternating, block, graft or star (radial block) architectures. In fact, the invention is not limited to the architecture of the polymer. Additionally, copolymers which contain at least one hydrogenated diene unit would also be equally applicable to this invention, e.g., hydrogenated dienenitrile copolymers such as for example, hydrogenated butadiene-acrylonitrile copolymers.

While anisole was the most thoroughly tested post-reactant, there is no need once again, to limit the invention to such. In fact, other alkyl aromatic ethers are believed to be capable of reacting in an equivalent manner, particularly alkyl phenyl ethers of the type shown below as formula (I):

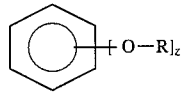
(I)

wherein R can be $C_{1-10}$ alkyl; substituted alkyl wherein the substituents can be halogens; aryl, particularly phenyl and substituted aryl wherein the substituents can be $C_{1-10}$ alkyl, halogenated alkyl or halogens; $C_{1-20}$ aralkyl; $C_{1-20}$ alkaryl; and z is an integer from 1 to 6.

In another embodiment of the invention, the alkylating reagent contains both an ether linkage and an alkyl linkage as shown below as formula (II):

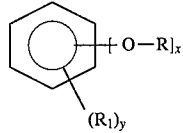
(II)

wherein R is as defined previously, $R_1$ is independently selected from the same group as R, x is an integer from 1 to (6-y) and y is an integer from 0 to 5.

In yet another embodiment of the invention, the alkylating agent is a cyclic ether as shown below in formula (III):

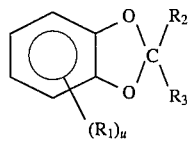
(III)

wherein $R_1$ is as defined previously, u is an integer from 0 to 4, $R_2$ and $R_3$ are independently selected from the group consisting of hydrogen; $C_{1-10}$ alkyl; substituted alkyl wherein the substituents can be halogens; aryl, particularly phenyl; substituted aryl wherein the substituents can be $C_{1-10}$ alkyl, halogenated alkyl or halogens; $C_{1-20}$ aralkyl; and $C_{1-20}$ alkaryl.

The alkylating agent is not limited to ethers, but rather can be expanded into the class of thioethers, such as shown in formula (IV):

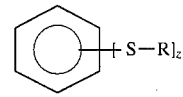
(IV)

wherein R and z are as defined previously.

In a further modification of the alkylating agent, the class can be expanded to include mixed ethers, which include thioether linkages such as is shown in formula (V):

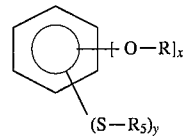
(V)

wherein R is as defined previously and $R_5$ is selected from the same group as defined by $R_2$ and x and y are as previously defined.

In still a further embodiment of this invention, the alkylating agent can include an acyl amine linkage as shown in formula (VI):

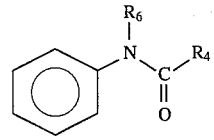
(VI)

wherein $R_6$ is selected independently from the group defined previously for $R_2$ and $R_4$ is selected from the group defined previously for R.

In yet another embodiment of this invention, the aromatic ring of the acyl amine is substituted with at least one chemical linkage selected from the group consisting of carbon-oxygen, carbon-carbon or carbon-sulfur as shown in formula (VII)

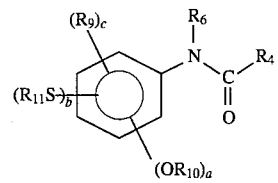
(VII)

wherein $R_6$ and $R_4$ are as defined previously, $R_{10}$ is selected independently from the group defined previously for R, $R_{11}$ is selected independently from the group defined previously for $R_5$, $R_9$ is selected independently from the group previously defined for $R_1$; and a, b and c are integers ranging independently from 0 to 5 with the restriction that $a+b+c \leq 5$.

The above described modification improves the chemical stability of the resulting polymers, particularly with respect to arylsulfonylation and nitration. The resulting polymers are more resistant to other modes of degradation, e.g., oxidation, ozonolysis and additionally exhibit enhanced chemical stability.

This invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for improving the chemical stability of a hydrogenated polymer which contains at least one residual unsaturated unit therein, comprising the step of reacting at least one residual unsaturated unit with at least one reagent selected from the group consisting of alkyl aromatic ethers, alkyl phenyl ethers, cyclic ethers, thioethers, acyl amines, and substituted derivatives thereof.

2. The process of claim 1 wherein the reagent is selected from the group consisting of:

(a) an aromatic ether of the type shown in formula (I)

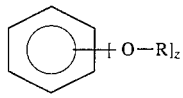
(I)

wherein R can be $C_{1-10}$ alkyl, $C_{1-10}$ halogenated alkyl, aryl, substituted aryl wherein the substituents are selected from the group consisting of $C_{1-10}$ alkyl, $C_{1-10}$ halogenated alkyl and halogens, $C_{1-20}$ aralkyl, $C_{1-20}$ alkaryl, and z is an integer from 1 to 6;

(b) a ring substituted aromatic ether as shown in formula (II):

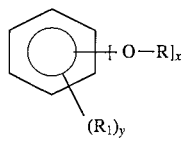
(II)

wherein R is as defined previously, $R_1$ is independently selected from the same group as R, x is an integer from 1 to (6-y) and y is an integer from 0 to 5;

(c) a cyclic ether as shown in formula (III)

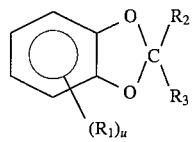
(III)

wherein $R_1$ is as defined previously, u is an integer from 0 to 4, $R_2$ and $R_3$ are independently selected from the group consisting of hydrogen, $C_{1-10}$ alkyl, $C_{1-10}$ halogenated alkyl, aryl, substituted aryl wherein the substituents are selected from the group consisting of $C_{1-10}$ alkyl, $C_{1-10}$ halogenated alkyl and halogens, $C_{1-20}$ aralkyl and $C_{1-20}$ alkaryl;

(d) a thioether as shown in formula (IV):

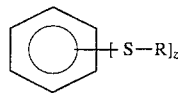
(IV)

wherein R and z are as defined previously;

(e) a ring-substituted thioether as shown in formula (V)

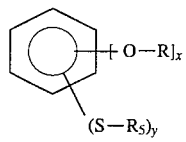
(V)

wherein R is as defined previously and $R_5$ is selected from the same group as defined by $R_2$ and x and y are as previously defined;

(f) an acyl amine having an amine linkage as in formula (VI)

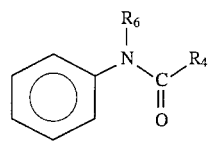
(VI)

wherein $R_6$ is selected independently from the group defined previously for $R_2$ and $R_4$ is selected from the group defined previously for R; and (g) a ring-substituted acyl amine wherein the ring substitution has at least one chemical linkage selected from the group consisting of carbon-oxygen, carbon-carbon or carbon-sulfur as shown in formula (VII)

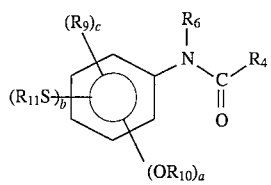
(VII)

wherein $R_6$ and $R_4$ are as defined previously, $R_{10}$ is selected independently from the group defined previously for R, $R_{11}$ is selected independently from the group defined previously for $R_5$, $R_9$ is selected independently from the group previously defined for $R_1$, and a, b and c are integers ranging independently from 0 to 5 with the restriction that $a+b+c \leq 5$, with the further limitation that further that a carbon atom adjacent to an oxygen ether atom is not a tertiary carbon atom.

3. The process of claim 2 wherein the reagent is anisole.

4. The process of claim 1 wherein the elastomer is at least partially dissolved in a solvent.

5. The process of claim 4 wherein the solvent is selected from the group consisting of carbon tetrachloride, chloroform, methylene chloride, hexanes, carbon disulfide and ethylene chloride.

6. The process of claim 4 wherein the process occurs in the presence of a Lewis acid.

7. The process of claim 6 wherein the Lewis acid is selected from the group consisting of aluminum halide, zinc halide, titanium halide, boron halide and tin halide.

8. The process of claim 6 wherein the process occurs under an inert atmosphere.

9. The process of claim 1 wherein the process further comprises the step of a benzenesulfonylation reaction.

10. The process of claim 1 wherein the process further comprises the step of a nitration reaction.

11. The process of claim 10 wherein the nitration reaction is achieved by the reaction of the thermoplastic elastomer with a nitrating agent.

12. The process of claim 11 wherein the nitrating agent is selected from the group consisting of acetyl nitrate, trihaloacetyl nitrate, nitronium trihalomethanesulfonate and nitric acid and salts thereof.

13. A process for improving the chemical stability of a hydrogenated thermoplastic elastomer which contains at least one polymerized diene component therein, the polymerized diene component having residual unsaturation comprising the step of reacting at least one unsaturated diene monomeric unit within the polymerized diene component with at least one reagent selected from the group consisting of alkyl aromatic ethers, alkyl phenyl ethers, cyclic ethers, thioethers, acyl amines, and substituted derivatives thereof.

14. The process of claim 13 wherein the reagent is selected from the group consisting of:

(a) an aromatic ether of the type shown in formula (I)

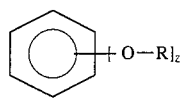
(I)

wherein R can be $C_{1-10}$ alkyl, $C_{1-10}$ halogenated alkyl, aryl, substituted aryl wherein the substituents are selected from the group consisting of $C_{1-10}$ alkyl, $C_{1-10}$ halogenated alkyl and halogens, $C_{1-20}$ aralkyl, $C_{1-20}$ alkaryl, and z is an integer from 1 to 6;

(b) a ring substituted aromatic ether as shown in formula (II):

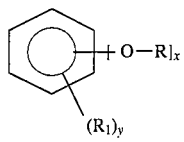
(II)

wherein R is as defined previously, $R_1$ is independently selected from the same group as R, x is an integer from 1 to (6-y) and y is an integer from 0 to 5;

(c) a cyclic ether as shown in formula (III)

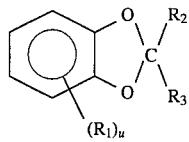
(III)

wherein $R_1$ is as defined previously, u is an integer from 0 to 4, $R_2$ and $R_3$ are independently selected from the group consisting of hydrogen, $C_{1-10}$ alkyl, $C_{1-10}$ halogenated alkyl, aryl, substituted aryl wherein the substituents are selected from the group consisting of $C_{1-10}$ alkyl, $C_{1-10}$ halogenated alkyl and halogens, $C_{1-20}$ aralkyl and $C_{1-20}$ alkaryl;

(d) a thioether as shown in formula (IV):

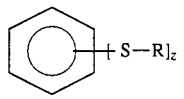
(IV)

wherein R and z are as defined previously;

(e) a ring-substituted thioether as shown in formula (V)

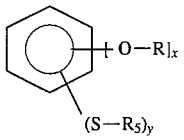
(V)

wherein R is as defined previously and $R_5$ is selected from the same group as defined by $R_2$ and x and y are as previously defined;

(f) an aromatic acyl amine having an amine linkage as in formula

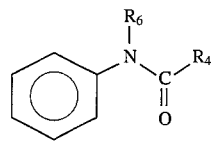
(VI)

wherein $R_6$ is selected independently from the group defined previously for $R_2$ and $R_4$ is selected from the group defined previously for R; and (g) a ring-substituted acyl amine wherein the ring substitution has at least one chemical linkage selected from the group consisting of carbon-oxygen, carbon-carbon or carbon-sulfur as shown in formula (VII)

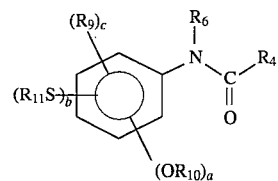
(VII)

wherein $R_6$ and $R_4$ are as defined previously, $R_{10}$ is selected independently from the group defined previously for R, $R_{11}$ is selected independently from the group defined previously for $R_5$, $R_9$ is selected independently from the group previously defined for $R_1$, and a, b and c are integers ranging independently from 0 to 5 with the restriction that $a+b+c \leq 5$, with the further limitation that further that a carbon atom adjacent to an oxygen ether atom is not a tertiary carbon atom.

15. The process of claim 14 wherein the reagent is anisole.
16. The process of claim 13 wherein the elastomer is at least partially dissolved in a solvent.
17. The process of claim 16 wherein the solvent is selected from the group consisting of carbon tetrachloride, chloroform, methylene chloride, hexanes, carbon disulfide and ethylene chloride.
18. The process of claim 16 wherein the process occurs in the presence of a Lewis acid.
19. The process of claim 18 wherein the Lewis acid is selected from the group consisting of aluminum halide, zinc halide, titanium halide, boron halide and tin halide.
20. The process of claim 6 wherein the process occurs under an inert atmosphere.
21. The process of claim 13 wherein the process further comprises the step of a benzenesulfonylation reaction.
22. The process of claim 13 wherein the process further comprises the step of a nitration reaction.
23. The product of the process of claim 1.
24. The product of the process of claim 2.
25. The product of the process of claim 9.
26. The product of the process of claim 10.
27. The product of the process of claim 13.
28. The product of the process of claim 14.
29. The product of the process of claim 21.
30. The product of the process of claim 22.

* * * * *